US008547637B2

(12) United States Patent
Lee et al.

(10) Patent No.: US 8,547,637 B2

(45) Date of Patent: Oct. 1, 2013

(54) OPTICAL FILM COMPOSITE FOR BRIGHTNESS ENHANCEMENT INCLUDING A BIREFRINGENT POLYMER LAYER

(75) Inventors: Seo-Hern Lee, Yongin-si (KR); Myeong-Kyun Kang, Gyeonggi-do (KR); Jong-Bok Choi, Suwon-si (KR); Yeon-Shin Kim, Seoul (KR); Byoung-Kyu Kim, Busan (KR); Jong-Seo Lee, Yongin (KR); Chi-Deuk Kim, Woodbury, MN (US); Dong-Won Chae, Suwon (KR); Kang-Il Seo, Suwon (KR)

(73) Assignee: 3M Innovative Properties Company, St. Paul, MN (US)

( * ) Notice: Subject to any disclaimer, the term of this patent is extended or adjusted under 35 U.S.C. 154(b) by 967 days.

(21) Appl. No.: 12/159,263

(22) PCT Filed: Dec. 28, 2006

(86) PCT No.: PCT/US2006/049428

§ 371 (c)(1), (2), (4) Date: Oct. 6, 2008

(87) PCT Pub. No.: WO2007/079145

PCT Pub. Date: Jul. 12, 2007

(65) Prior Publication Data

US 2009/0303589 A1 Dec. 10, 2009

(30) Foreign Application Priority Data

Dec. 30, 2005 (KR) ........................ 10-2005-0134698

(51) Int. Cl.

*G02B 5/30* (2006.01)

(52) U.S. Cl.

USPC ................................ 359/485.03; 359/489.01

(58) Field of Classification Search

USPC ....................................... 359/485.03, 489.01

See application file for complete search history.

(56) References Cited

U.S. PATENT DOCUMENTS

| | | | | |
|---|---|---|---|---|
| 5,422,756 | A * | 6/1995 | Weber | 359/485.03 |
| 5,825,542 | A | 10/1998 | Cobb, Jr. et al. | |
| 6,101,032 | A | 8/2000 | Wortman et al. | |
| RE37,377 | E | 9/2001 | Gunjima | |
| 6,340,404 | B1 | 1/2002 | Oka et al. | |
| 6,368,699 | B1 | 4/2002 | Gilbert et al. | |
| 6,673,425 | B1 | 1/2004 | Hebrink | |
| 6,737,154 | B2 | 5/2004 | Jonza et al. | |
| 2004/0156104 | A1* | 8/2004 | Hayashi et al. | 359/492 |
| 2004/0265510 | A1 | 12/2004 | Miroshin | |
| 2006/0082698 | A1* | 4/2006 | Ko et al. | 349/61 |

FOREIGN PATENT DOCUMENTS

| | | |
|---|---|---|
| CN | 1503916 | 6/2004 |
| JP | 2004-512199 | 4/2004 |
| JP | 2004-184575 | 7/2004 |
| WO | WO 95/17303 | 6/1995 |

(Continued)

*Primary Examiner* — Frank Font

(74) *Attorney, Agent, or Firm* — Jay R. Pralle; Lisa P. Fulton

(57) ABSTRACT

The present invention provides an optical film composite that includes a linear, reflective polarizing film; a first polymeric substrate layer having birefringence, which is placed on the reflective polarizing film; and a second polymeric substrate layer placed beneath the reflective polarizing film, wherein the optical axis of the first polymeric substrate layer is oriented with respect to the transmission axis of the reflective polarizing film to have of 0° to 25° of an angular difference between the axes. The optical film composite can be employed in LCD devices to improve optical performance.

20 Claims, 6 Drawing Sheets

301

302

303

(56) References Cited

FOREIGN PATENT DOCUMENTS

| | | |
|---|---|---|
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 99/36262 | 7/1999 |
| WO | WO 02/34541 | 5/2002 |
| WO | WO 02/084343 | 10/2002 |
| WO | WO 2007-079148 | 7/2007 |

* cited by examiner

OPTICAL FILM COMPOSITE FOR BRIGHTNESS ENHANCEMENT INCLUDING A BIREFRINGENT POLYMER LAYER

CROSS REFERENCE TO RELATED APPLICATIONS

This application is a national stage filing under 35 U.S.C. §371 of PCT/US2006/049428, filed Dec. 28, 2006, which claims priority to KR Application No. 10-2005-0134698, filed Dec. 30, 2005, the disclosure of which is incorporated by reference in its/their entirety herein.

The present invention relates to a brightness enhancing optical film composite, and more precisely to a brightness enhancing optical film composite with improved optical properties.

BACKGROUND

The optical film composite disclosed herein can be used as a device for achieving the brightness enhancing and light diffusing functions, especially in a liquid crystal display (LCD) device. In general, an LCD displays a desired image on its screen by controlling the transmittance of light from a backlight unit using a plurality of liquid crystal cells arranged in a matrix and a plurality of control switches for converting video signals which will be provided to each of the liquid crystal cells.

The backlight unit is classified as either an edge type or a direct type depending on the placement of its light source with respect to the liquid crystal panel. In the edge type, a light guide plate (which converts linear light of the lamp to planar light) is necessary because the lamp is placed on the side. But in the direct type, the light guide plate is not necessary because the lamp is placed under the surface of the liquid crystal panel. Direct type backlights are more widely used for large-sized LCD devices such as TVs due to higher optical efficiency, simpler structure and lack of size limitation for the display surface.

SUMMARY OF THE INVENTION

The present disclosure provides an optical film composite that includes a linear reflective polarizing film, a first birefringent polymeric substrate layer having birefringence, which is placed on the reflective polarizing film, and a second polymeric substrate layer placed beneath the reflective polarizing film. The optical axis of the first polymeric substrate layer is oriented with respect to the transmission axis of the reflective polarizing film to have 0° to 25° of an angular difference of between the axes. The optical film composite can be incorporated into a liquid crystal display. In some embodiments, at least the first polymeric substrate can be imparted with light diffusion properties. In some embodiments, at least the first polymeric substrate is PET.

DETAILED DESCRIPTION OF THE PREFERRED EMBODIMENT

Figure 1:
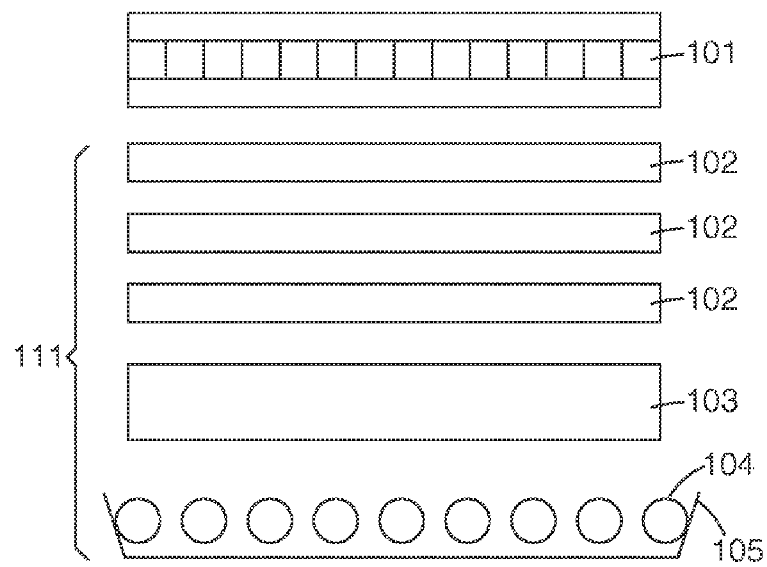
FIG. 1 is a perspective view showing the general structure of a liquid crystal display device for TV.

FIG. 1 shows one embodiment of the common structure of a LCD device for a TV, including a liquid crystal panel 101 and a backlight unit 111. The backlight unit 111 includes a plurality of lamps 104 positioned on the downside, a reflective plate 105 capable of reflecting light to redirect it toward the liquid crystal panel, a diffusing plate 103 and at least one diffuser 102 to uniformly distribute the light. In general, the diffusing plate is prepared by incorporating beads or other diffusing structures in the materials of the diffusing plate and then extruding it, while the diffuser is prepared by applying a light diffusing treatment such as a bead treatment on the polymer film.

As a constituent for improving the brightness of the LCD device, a reflective polarizer, such as a multilayer reflective polarizing film, can be incorporated on the diffuser 102. The reflective polarizing film selectively reflects a light component having specific polarization states and the reflected light is redirected by the reflective plate positioned on the rear of the backlight unit and recirculated, thereby improving the overall brightness of the display.

The multilayer reflective polarizing film can, in some exemplary embodiments, have a multilayer stacked structure in which at least two materials are alternately stacked, as disclosed in U.S. Pat. No. 6,368,699. Since in typical embodiments at least one stacked material has birefringence induced by tensile stress, the multilayer optical film capable of operating as a polarizer can be designed by inducing different refractive indices among the layers by employing an appropriate stretching treatment. Particularly preferred multilayer reflective polarizing films for the present invention are disclosed in, for example, PCT Publication Nos. WO 95/17303, WO 95/17691, WO 95/17692, WO 95/17699, WO 96/19347 and WO 99/36262, all of which are incorporated by reference in the specification. One commercially available form of a multilayer reflective polarizer is marketed as Dual Brightness Enhanced Film (DBEF) by 3M Company, St. Paul, Minn.

Figure 2:
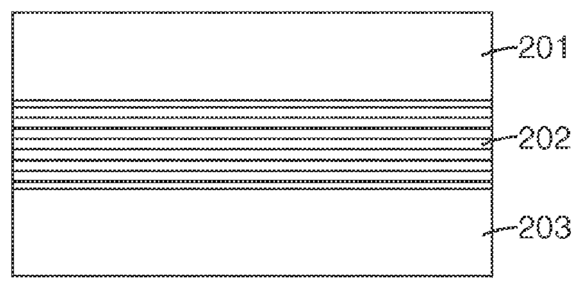
FIG. 2 is a schematic illustration of the conventional optical film composite on and beneath which polycarbonate (PC) layers are placed.

Multilayer optical films such as the above multilayer reflective polarizing film may sometimes warp when exposed to temperature variations. PCT Publication No. WO 2002/34541 discloses processes and materials for preventing warping of optical films by placing a dimensionally stable layer on the multilayer optical film. In particular, polycarbonate (PC) layers 201, 203 have been used for a suitable dimensionally stable layer placed on one or both sides of a multilayer optical film 202 (see FIG. 2).

However, the manufacturing costs are relatively high for PC in the multilayer reflective polarizing film in which PC is incorporated as a dimensionally stable layer. This is one of the reasons for increasing the manufacturing costs for the LCD device. Although there have been attempts to utilize low-cost polyester based polymers for a dimensionally stable layer, such reflective polarizing film so far has had the problem of deteriorating optical properties such as brightness.

The present disclosure provides a linear reflective polarizing film composite having low manufacturing costs while providing similar or improved anti-warping and optical properties when compared with conventional reflective polarizing film composites.

The present disclosure also provides an optical film composite that can reduce the overall thickness of the display, in particular by reducing the thickness of the backlight unit, all while maintaining superior optical properties as compared to conventional reflective polarizing film composites. This can be accomplished by integrating the functions of the linear reflective polarizing film and those of the diffuser.

The features of the present disclosure can be achieved by placing a polyester based polymer having birefringence (rather than polycarbonate (PC) having non-birefringence) on the linear reflective polarizing film, and by precisely controlling the angle between the transmission axis of light which passes through the reflective polarizing film and the optical axis of the birefringent polymer layer placed on the film. The birefringent polymer layer may be one treated to have a light diffusing function.

The terms used in the present specification are to be construed as follows: The term "placed" does not necessarily mean that the layers are adhered together by an adhesive or else. The meaning of the term "placed" should be construed to encompass "laminated" (i.e., adhering layers together by an adhesive material) and "stacking" (i.e., simply stacking layers without using an adhesive material).

The phrase "placed on (or beneath)" does not necessarily mean layers being disposed immediately adjacent to each other. "On (or beneath)" be construed simply as indicating the relative positions between two layers, and thus, another layer such as adhesives can be interpositioned between the two layers.

The film "treated to have a light diffusing function" includes a haze-treated film and a diffuser, and comprises a "matte-treated" film, of which surface is made minutely coarse, a film having a rough surface, a "bead-treated" film having beads made of polymers or glass are fixed to form the light diffusion layer, and films treated with other conventional methods for diffusing light.

The film "having a diffuser function" may be a film treated to have a light diffusing function by using any methods used to produce a diffuser, such as bead treatment, in the LCD device.

Unless mentioned otherwise, "reflective polarizing film" means a linear, reflective polarizing film.

Figure 8:
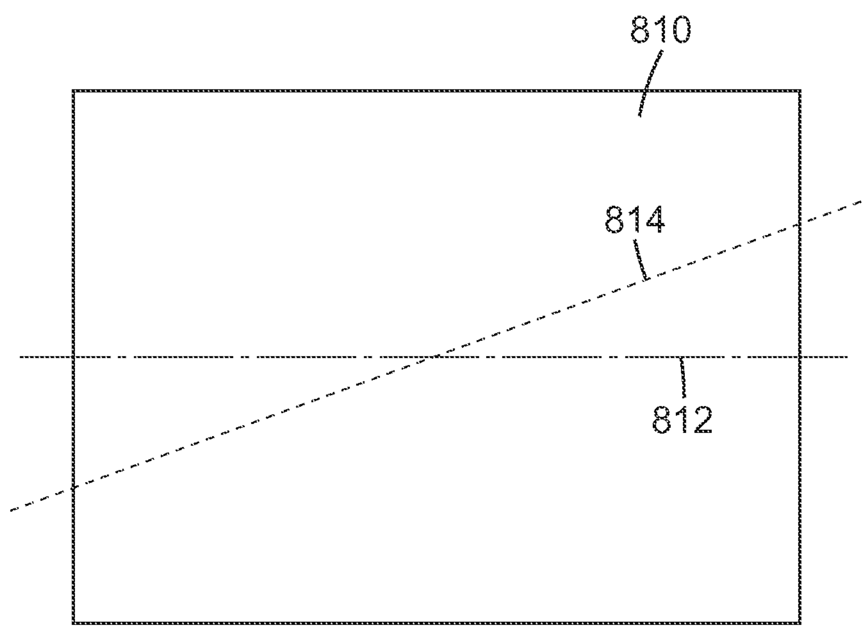
FIG. 8 is a schematic plan view showing one embodiment of an optical film composite.

One embodiment of an optical film composite 810 of the present disclosure can be achieved by placing a first polymeric substrate layer having birefringence on a linear, reflective polarizing film, placing a second polymeric substrate layer beneath the reflective polarizing film, and then orienting the optical axis 812 of the first polymeric substrate layer with respect to the transmission axis 814 of the reflective polarizing film to have an angular difference of between 0° to 25°, and preferably of 0° to 15° (see FIG. 8).

Figure 3A:
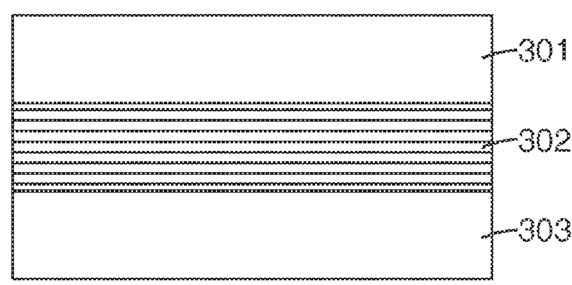
FIG. 3A is a schematic illustration showing one embodiment of the present invention, wherein a polymeric substrate layer having birefringence being placed on and beneath a reflective polarizing film.

FIG. 3A is a schematic illustration showing one embodiment of an optical film composite of the present disclosure. Referring to FIG. 3A, a first polymeric substrate layer 301 is placed on a reflective polarizing film 302 and a second polymeric substrate layer 303 is placed beneath the reflective polarizing film.

The reflective polarizing film 302 includes multilayer optical films, including multilayer films having a high reflectivity over a wide bandwidth (having optical layers, all or some of the layers being birefringent or all or some of the layers being isotropic), and continuous/disperse phase optical films. Multilayer reflective optical films and continuous/disperse phase reflective optical films both rely on index of refraction differences between at least two different materials (preferably polymers) to selectively reflect light of at least one polarization orientation. Optical films that are especially suitable for use in composites of the present disclosure include multilayer reflective films such as those described in, for example, PCT Publication Nos. WO 95/17303; WO 95/17691; WO 95/17692; WO 95/17699; WO 96/19347; and WO 99/36262, all of which are incorporated herein by reference. The film is preferably a multilayer stack of polymer layers with a Brewster angle (the angle at which reflectance of p-polarized light goes to zero) that is very large or nonexistent. The film is made into a multilayer mirror or polarizer whose reflectivity for p-polarized light decreases slowly with the angle of incidence, is independent of the angle of incidence, or increases with the angle of incidence away from the normal. This multilayered optical film has a high reflectivity (for both s- and p-polarized light) for any incident direction. One commercially available form of a multilayer reflective polarizer is marketed as Dual Brightness Enhanced Film (DBEF) by 3M Company, St. Paul, Minn. Multilayer reflective optical films are used herein as an example to illustrate the structures of the optical film composites of the present disclosure.

The first polymeric substrate layer 301 having birefringence is preferably a polyester based polymer (e.g., PET), and such polyester based polymers are usually prepared by using a biaxial stretching method. The birefringence of the first polymeric substrate layer is due to the difference of index of refraction between two axes perpendicular to each other in the plane of the first polymeric substrate layer. The index of refraction difference between an axis having the highest index of refraction and an axis having the lowest index of refraction is at least 0.05. An optical axis of the polymeric substrate layer means an axis having the smallest index of refraction difference with the polarizing film 302 and typically corresponds to the axis having the highest index of refraction in the polymeric substrate layer.

Figure 3B:
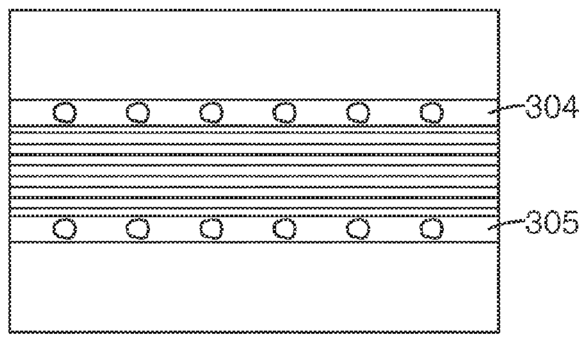
FIG. 3B is a schematic illustration showing one embodiment of the present invention, wherein a plurality of layers being laminated by an optical adhesive, which contains beads.

The first polymeric substrate layer may be placed on the reflective polarizing film 302 in the thickness corresponding to PC layer, which is typically placed on the film as a dimensionally stable layer. At this time, the first polymeric substrate layer may be haze-imparted by a matte treatment or other known methods. When haze-imparted, a haze level of at least 20% is preferred. Further, referring to FIG. 3B, the first polymeric substrate layer may be laminated on the reflective polarizing film by using an optical adhesive 304. An acrylate based adhesive is mainly used, such as an optical adhesive and beads made of glass, polymer, etc., may be added to said optical adhesive.

The second substrate layer 303 may be any polymers capable of preventing warping of the reflective polarizing film, and preferably polyester based polymers. In this case, the second polymeric substrate layer may or may not have a haze by a matte treatment or other known methods and, if it has, the preferred haze level is at least about 20%. Further, the second polymeric substrate layer may be laminated to the reflective polarizing film with the optical adhesive 305 and the adhesive may or may not contain beads.

When laminating polyester based polymers on or beneath the reflective polarizing film, the optical gain of the polarized light transmitted by the optical film composite may be reduced as compared with optical film composites in which non-birefringent polymers are used. This can occur particularly when the polyester based polymer layer placed on the upper side of the composite film has an optical axis oriented in a manner that is not coincident with the polarizing axis of the reflective polarizing film. Therefore, it can be important to arrange the polarizing axis of the reflective polarizing film and the optical axis of the polyester based polymer, the first polymeric substrate layer having birefringence, in an appropriate angle.

Figure 4:
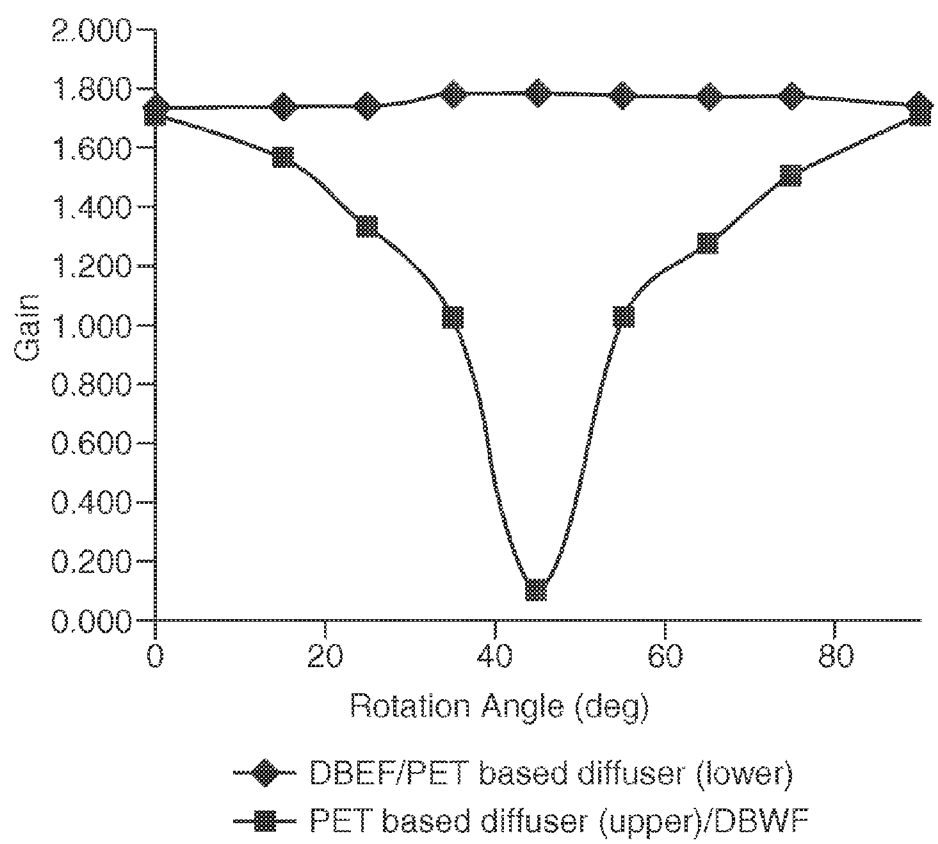
FIG. 4 is a graph showing the variation of the optical gain obtained, in two test sets that diffusers based on a birefringent polymer are disposed on and beneath the reflective polarizing film, respectively, when the optical axes of the birefringent polymer layer of the upper diffuser and of the birefringent polymer layer of the lower diffuser are rotated, respectively.

FIG. 4 is a graph showing gain as a function of rotation angle between the optical axis of a diffuser based on PET and the polarization axis of a reflective polarizing film when the PET is placed on top of and beneath the reflective polarizing film. A testing set placing a diffuser based on PET on the reflective polarizing film and a testing set placing a diffuser based on PET beneath the reflective polarizing film were provided and a polarizer was placed on the uppermost part of each reflective polarizing film in an angle that a polarized component could be transmitted (0°). In each testing set, intensity of light transmitted by the film layers was measured by a detector. The result is shown in FIG. 4. As can be confirmed in the graph of FIG. 4, the rotation of the PET based diffuser layer placed on top of the reflective polarizing film had more significant effect than the rotation of the diffuser placed beneath the film. That is, it can be understood that the arrangement of the birefringent polymer placed on the reflective polarizing film is more important than the arrangement beneath the film.

In this regard, the angular difference θ between the optical axis of the first polymeric substrate layer and the transmission axis of the reflective polarizing film beneath said layer is from 0° to 25°, preferably from 0° to 15°, more preferably from 0° to 5° and the most preferably 0°. The multilayer optical film composite within such angles shows the improved characteristic in the optical gain above the previous optical film composite.

On the other hand, the first and the second polymeric substrate layers placed on and beneath the reflective polarizing film according to the present disclosure may function as a dimensionally stable layer preventing warping of the reflective polarizing film. Table 1 below is the result of warping test (thermal shock test (−40° C., 85° C.)) on the optical film composite, having PET on top of and beneath the reflective polarizer. For a test under surrounding conditions similar to the previous reflective polarizing film on which a haze treated PC layer is placed, this test is performed, when clear PET was used as the dimensionally stable layer, with laminating the films with an optical adhesive containing glass or polymeric beads and when matte treated PET was used, with laminating the films with a common optical adhesive.

TABLE 1

| PET type | Adhesive | Cycle # | PET thickness (μm) | Warping |
|---|---|---|---|---|
| Clear PET | Acrylate based optical adhesive and glass beads (10 μm) | 100 | 122 | No |
| | Acrylate based optical adhesive and glass beads (50 μm) | 100 | 120 | No |
| | Acrylate based optical adhesive and glass beads (10 μm) | 100 | 185 | No |
| Matte PET | Acrylate based optical adhesive | 60 | 140 | No |

As can be confirmed from the above testing results, in case of using PET as the first and the second polymeric substrate layers, the effect of preventing warping can be also achieved like the previous optical film composite using PC.

As a result, it can be found that optical film composites of the present disclosure (i.e., using a low-cost birefringent polymer including polyester based polymer as the first polymeric substrate layer and precisely controlling the optical axis of this layer) can be made with lower manufacturing cost than the previous technology, while maintaining or improving anti-warping and optical performance properties.

The present disclosure is further directed to placing a first polymeric substrate layer having birefringence and a diffuser function, on a linear reflective polarizing film, and placing a second polymeric substrate layer beneath the reflective polarizing film, and then controlling the transmission axis of the reflective polarizing film and the optical axis of the first polymeric substrate within a constant angle.

Figure 5A:
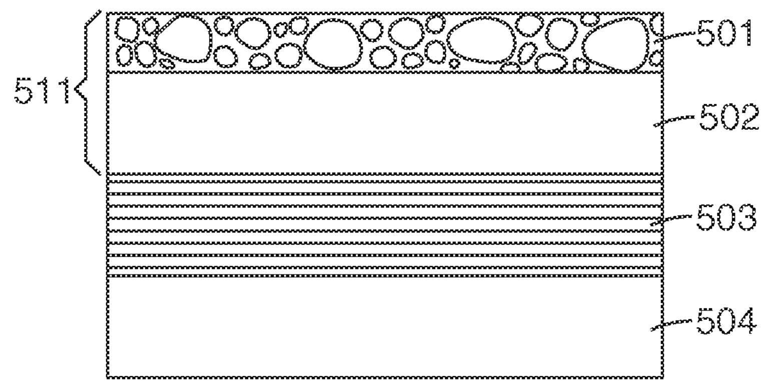
FIG. 5A is a schematic illustration showing one embodiment of the present invention, wherein a diffuser sheet being placed on the reflective polarizing film.

FIG. 5A is a schematic illustration showing one embodiment of the present disclosure, whereby a polymer layer having a diffuser function (diffuser sheet) is placed on top of a reflective polarizing film. Referring to FIG. 5A, a first polymeric substrate layer 502, on which a light diffusing layer 501 is placed, is provided. The layers 501 and 502 together constitute a diffuser sheet 511 functioning as a diffuser. This diffuser sheet 511 is placed on a reflective polarizing film 503 and a second substrate layer 504 is placed beneath the reflective polarizing film 503.

The first polymeric substrate layer having birefringence 502 is preferably a polyester based polymer. The polymeric substrate layer having birefringence can be placed on the reflective polarizing film 503 in a thickness corresponding to PC layer typically provided as a dimensionally stable layer or in a thickness corresponding to the polymer layer placed as a substrate layer beneath the diffuser. The polymeric substrate layer having birefringence serves as the substrate layer forming the diffuser sheet 511 as well as the dimensionally stable layer preventing warping of the reflective polarizing film 503.

The polymeric substrate layer having birefringence 502 is preferably treated by conventional methods for preparing a diffuser, including for example a bead treatment method fixing beads such as glass or polymers. As one specific example, a light diffusing layer 501 including beads is placed on the polymeric substrate layer having birefringence 502. The beads disposed on the surface of the first polymeric substrate layer have a shape of a granule and are adhered to the surface of the first polymeric substrate layer by using an adhesive. The beads have refractive index different from that of air. The sizes of the beads adhered to the first polymeric substrate layer can be the same or different. Polarized light passed through the first polymeric substrate layer via the reflective polarizing film is diffused on the surface of the beads or in the beads. As another specific example, the light diffusing layer 501 can consist of the beads and a binder. The binder has fluidity and viscosity and the beads are mixed in the binder. The refractive index of the binder can be different from that of the beads in order to further improve the light diffusing characteristic of the light diffusing layer 501. The light diffusing material consisting of the beads and the binder is disposed on the surface of the first polymeric substrate layer in a form of thin film. The beads and the binder in the light diffusing layer 501 disposed on the first polymeric substrate layer in the form of thin film diffuse the polarized light passed through the first polymeric substrate layer via the reflective polarizing film.

The second polymeric substrate layer 504 may be any polymer capable of preventing warping of the reflective polarizing film, and is preferably polyester based polymer. The second polymeric substrate layer may be one treated or not treated to have a haze (preferably at least about 20%) or a light diffusing function.

Figure 5B:
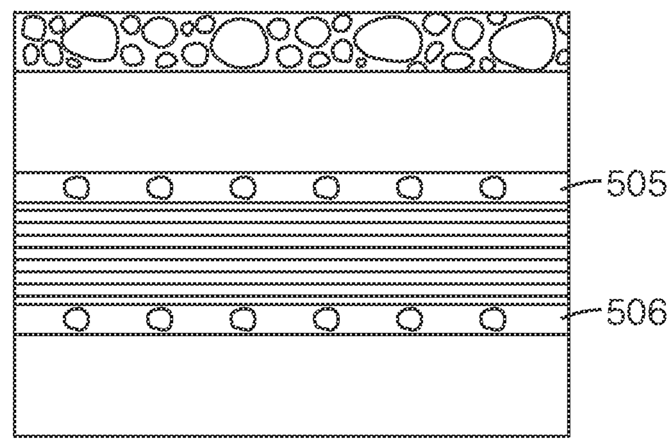
FIG. 5B is a schematic illustration showing one embodiment of the present invention, wherein a plurality of layers being laminated by an optical adhesive, which contains beads, and a diffuser sheet being equipped.

Referring to FIG. 5B showing one example of the present disclosure, the first polymeric substrate layer and the second polymeric substrate layer can be laminated on the reflective polarizing film by optical adhesives 505, 506. The optical adhesive can be acrylate based adhesive, and may or may not contain beads such as glass or polymer.

In one embodiment, when the diffuser sheet based on polyester based polymer is placed on the reflective polarizing film and the polyester based polymer layer is placed beneath the reflective polarizing film, the optical gain of polarized light passing through the optical film composite is good in certain cases, but in most cases, it is not better than that of the optical film composite on which polymer having non-birefringence property such as PC is placed due to the aforementioned reasons. Accordingly, the present inventors have found that the optical gain can be improved by precisely controlling the polarization axis of the diffuser sheet and the transmission axis of the reflective polarizing film, and furthermore, the optical gain can be synergistically improved with a suitable haze treatment.

The above effects have been confirmed by experimental results as shown in Table 3 below and in FIG. 6. For a test, PET was used as the polymer having birefringence. A PET layer having no haze on the reflective polarizing film (No. 1) and the diffuser sheets 1, 2, 3 based on PET (Nos. 2, 3, 4) having haze levels of 95.8%, 62.5%, 60.2%, respectively, were disposed, and then, the variation of the optical gain was measured while varying the optical axis by rotating upper layer. A clear PET was placed beneath the reflective polarizing film. The constitutions of experimental optical film composites are summarized as follows:

TABLE 2

| No. | Lower layer + reflective polarizing film + upper layer | Transmittance of the upper layer | Haze level of the upper layer (%) |
|---|---|---|---|
| 1 | PET + reflective polarizing film + PET | 95.3 | — |
| 2 | PET + reflective polarizing film + diffuser sheet 1 | 99.7 | 95.8 |
| 3 | PET + reflective polarizing film + diffuser sheet 2 | 93.2 | 60.2 |
| 4 | PET + reflective polarizing film + diffuser sheet 3 | 93.5 | 62.5 |

The experimental results of the optical film composites of Nos. 1 to 4 are as follows:

TABLE 3

| Angle θ (°) | No. 1 | No. 2 | No. 3 | No. 4 |
|---|---|---|---|---|
| 0 | 1.653 | 1.734 | 1.653 | 1.642 |
| 2 | 1.649 | 1.747 | 1.646 | 1.651 |
| 4 | 1.647 | 1.753 | 1.627 | 1.659 |
| 6 | 1.64 | 1.752 | 1.609 | 1.661 |
| 8 | 1.633 | 1.744 | 1.574 | 1.659 |
| 10 | 1.623 | 1.73 | 1.533 | 1.655 |
| 12 | 1.591 | 1.713 | 1.484 | 1.644 |
| 14 | 1.572 | 1.688 | 1.433 | 1.634 |
| 16 | 1.55 | 1.662 | 1.337 | 1.617 |
| 18 | 1.527 | 1.634 | 1.308 | 1.601 |
| 20 | 1.5 | 1.601 | 1.224 | 1.584 |

When the angle θ between the optical axis of the upper layer and the transmission axis of the reflective polarizing film is 0°, it is theoretically expected that the optical gain is maximum, but the maximum value appears at 4°, 6° in case of the optical film composites of Nos. 2 and 4 in the Table 2 above, respectively. Generally, a PET film produced by a biaxial stretching method deteriorates in view of the uniformity of the optical axis as it deviates from a center region (the optical axis=0°) of the film stretched, and the maximum values at above 4°, 6° are errors that occurred by not using the exact center region of biaxial stretched PET film in the optical film composites of Nos. 2 and 4. Thus, these values are actually obtained at the state of θ=0°.

Figure 6:
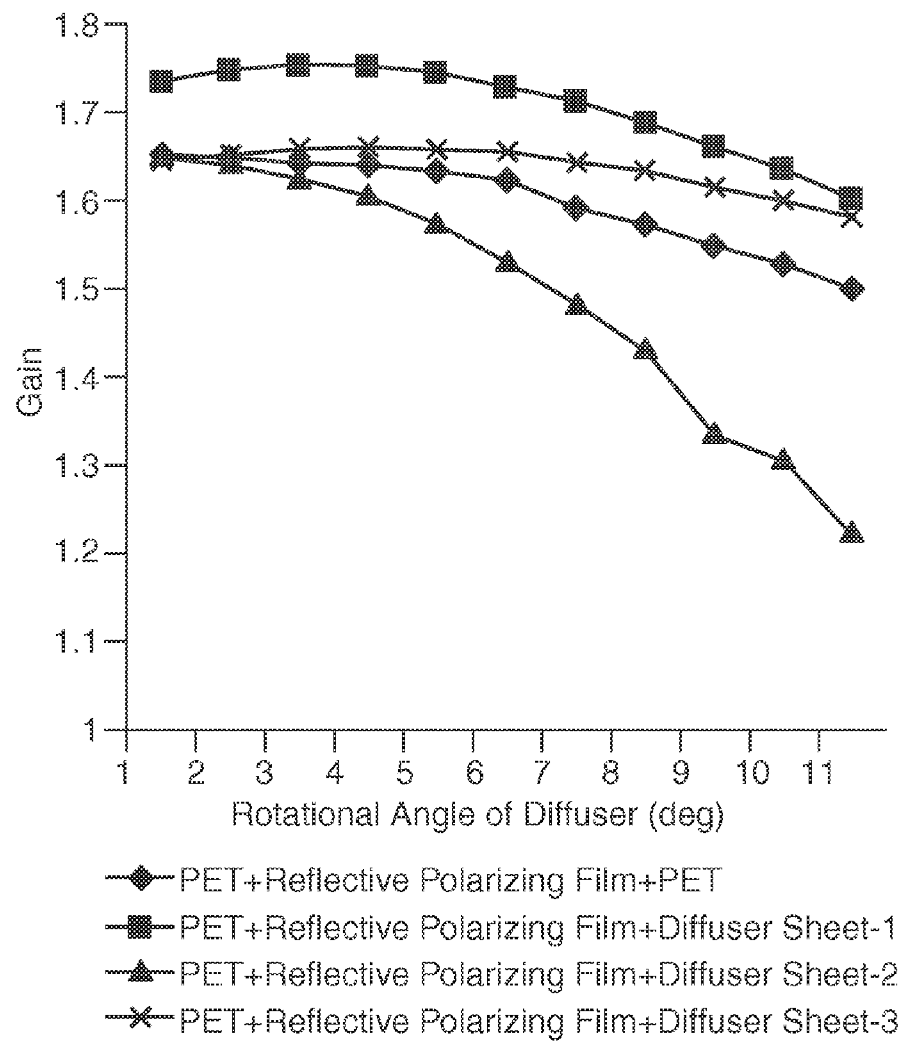
FIG. 6 is a graph showing the variation of optical gains in accordance with the rotation of the optical axis and a haze level of the polymer substrate layer placed above, in several optical film composites.
Figure 7A:
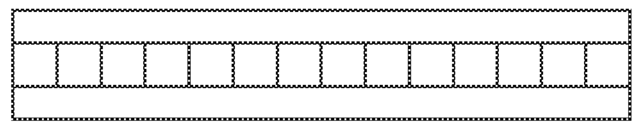
FIGS. 7*a* and *b* are drawings schematically illustrating a section of the liquid display device for TV and comparing the cases of using the conventional reflective polarizing film composite and the reflective polarizing film composite of the present invention.
Figure 7A:
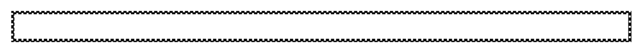
Figure 7B:
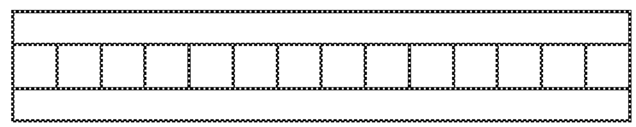
Figure 7B:
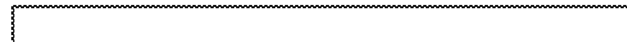
Figure 7B:
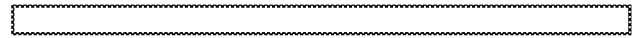

As can be seen from Table 3 and FIG. 6, the optical gain is carefully varied depending on the angle θ between the optical axis of the upper layer and the transmission axis of the reflective polarizing film, and particularly it can be confirmed that the smaller the angle is, the better the optical gain is. The suitable range of 0 is from 0° to 25°, preferably from 0° to 15°, more preferably from 0° to 5°, and most preferably 0°. In this range of angles, the optical film composite according to the present invention is superior in performance to the conventional reflective polarizing film composite.

On the other hand, referring to FIGS. 5A and 5B, the optical film composite is a form in which a constitution and a function of the diffuser are integrated with the conventional reflective polarizing film. Thus, a device in which the number of the diffuser decreased by one or more as compared to the conventional LCD device can be provided. This result is explained by referring to FIG. 7. FIG. 7 compares the case of using the conventional reflective polarizing film composite (FIG. 7*a*) to the case of using the reflective polarizing film composite according to the present invention (FIG. 7*b*), in the LCD device used for a TV. Using two diffusers in FIG. 7*a* and one diffuser in FIG. 7*b*, the brightness and contrast was measured, and data such as Table 4 was obtained.

TABLE 4

| | Relative value of luminance | Relative value of contrast |
|---|---|---|
| (a) two diffusers + conventional reflective polarizing film composite | 100% | 100% |
| (b) one diffuser + reflective polarizing film composite of the present invention | 98% | 109% |
| (c) two diffusers + reflective polarizing film composite of the present invention | 101% | 115% |

As can be confirmed from the table above, it can be found that there is no significant difference in the brightness, and the contrast rather increases by about 9% even though one diffuser is removed. Accordingly, in the optical film composites according to present disclosure, the total thickness of the LCD device, particularly the thickness of the backlight region, can be reduced without a loss of its optical performance. On the other hand, in case of the LCD device using the reflective polarizing film composite according to the present disclosure and two diffusers, such as (c) (not shown), it can be found that the thickness is similar to that of the conventional device while the optical performance is significantly improved.

Further, since the first polymer layer having birefringence simultaneously serves as the dimensionally stable layer and the substrate layer of the diffuser, one of the dimensionally stable layer and the substrate layer of the diffuser can be removed, so that the thickness of the display device can be reduced. In addition, the manufacturing cost of the LCD can be reduced by using polyester based polymer, which is cheaper than the PC as the substrate of the diffuser.

What is claimed:

1. An optical film composite comprising:

a linear, reflective polarizing film;

a first birefringent polymeric substrate layer having birefringence, which is placed on the reflective polarizing film, wherein the first birefringent polymeric substrate layer comprises an optical axis that corresponds to the axis having the highest index of refraction in the polymeric substrate layer; and a second polymeric substrate layer placed beneath the reflective polarizing film, wherein the optical axis of the first polymeric substrate layer is oriented with respect to a transmission axis of the reflective polarizing film to have 0° to 25° of an angular difference between the axes.

2. The optical film composite of claim 1, wherein the reflective polarizing film is a multilayer polarizing film.

3. The optical film composite of claim 1, wherein the first polymeric substrate layer is a polyester based polymer layer.

4. The optical film composite of claim 1, wherein the second polymeric substrate layer is a polyester based polymer layer.

5. The optical film composite of claim 1, wherein the first polymeric substrate layer is treated to have a light diffusing function.

6. The optical film composite of claim 1, wherein the second polymeric substrate layer is treated to have a light diffusing function.

7. The optical film composite of claim 3, wherein the polyester based polymer is polyethylene terephthalate (PET).

8. The optical film composite of claim 4, wherein the polyester based polymer is polyethylene terephthalate (PET).

9. The optical film composite of claim 1, wherein the first polymeric substrate layer has a haze level of at least 20%.

10. The optical film composite of claim 1, wherein the second polymeric substrate layer has a haze level of at least 20%.

11. The optical film composite of claim 5, wherein the light diffusing function is imparted by a matte treatment.

12. The optical film composite of claim 5, wherein the light diffusing function is imparted by incorporating beads.

13. The optical film composite of claim 1, wherein the optical axis of the first polymeric substrate layer is oriented with respect to the transmission axis of the reflective polarizing film to have 0° to 15° of an angular difference of between the axes.

14. The optical film composite of claim 1, wherein the optical axis of the first polymeric substrate layer is oriented with respect to the transmission axis of the reflective polarizing film to have 0° to 5° of an angular difference of between the axes.

15. The optical film composite of claim 1, wherein the first polymeric substrate layer and the reflective polarizing film, or the second polymeric substrate layer and the reflective polarizing film are laminated by an optical adhesive.

16. The optical film composite of claim 15, wherein the optical adhesive is an acrylate based adhesive.

17. The optical film composite of claim 15, wherein the optical adhesive contains beads.

18. A liquid crystalline display device comprising the optical film composite according to claim 1.

19. A process for manufacturing an optical film composite, comprising the steps of:

providing a linear, reflective polarizing film;

placing a first polymeric substrate layer having birefringence on a side of the reflective polarizing film so that an angular difference between an optical axis of the first polymeric substrate layer and a transmission axis of the reflective polarizing film is 0° to 25°; and placing a second polymeric substrate layer on the other side of the reflective polarizing film.

20. The process of claim 19, wherein the first polymeric substrate layer having birefringence is manufactured by a biaxial stretching method.

* * * * *